Dec. 9, 1958  J. A. PIANFETTI ET AL  2,863,924
METHOD OF PRODUCING POLYCHLORINATED ACETALDEHYDES
Filed Oct. 16, 1952
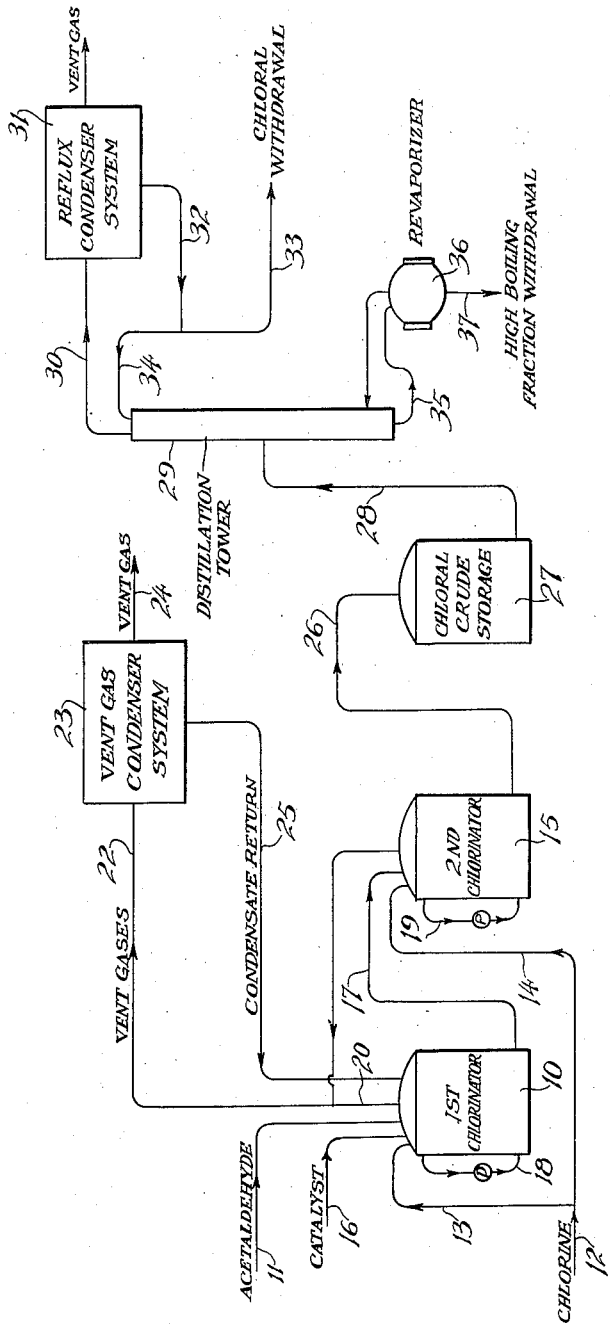
INVENTOR.
John A. Pianfetti
David J. Porter
BY
ATTORNEY

United States Patent Office 2,863,924
Patented Dec. 9, 1958

2,863,924

METHOD OF PRODUCING POLYCHLORINATED ACETALDEHYDES

John A. Pianfetti, South Charleston, W. Va., and David J. Porter, Painesville, Ohio, assignors to Food Machinery and Chemical Corporation, New York, N. Y., a corporation of Delaware Application October 16, 1952, Serial No. 315,132

6 Claims. (Cl. 260—601)

This invention relates to the production of chloral by the substantially anhydrous chlorination of acetaldehyde or its reversible polymers. We have discovered that acetaldehyde and its reversible polymers may be chlorinated in a substantially anhydrous condition to produce a high yield of chloral of sufficient purity that it may be distilled without intermediate chemical treatment to produce commercial chloral suitable for use in the manufacture of DDT (2,2-bis-(4-chlorophenyl)-1,1,1-trichloroethane) and other purposes.

In the production of chloral by the chlorination of acetaldehyde and its reversible polymers various competing side reactions occur and in order to produce an economical yield of chloral, it is necessary to operate the process in such a manner that the side or competing reactions are minimized and a substantially non-aqueous product having a high chloral content and suitable for direct distillation of the chloral therefrom is produced.

While we do not desire to be bound by any theories concerning the reactions which take place in the operation of our process, it is our belief that the following reasonably illustrates the reactions which take place in the chlorination of acetaldehyde and its reversible polymers:

(1) Formation of chloral from acetaldehyde:
   (a) $CH_3CHO+Cl_2 \rightarrow CH_2ClCHO+HCl$
   (b) $CH_2ClCHO+Cl_2 \rightarrow CHCl_2CHO+HCl$
   (c) $CHCl_2CHO+Cl_2 \rightarrow CCl_3CHO+HCl$ (2) Formation of butyrchloral (2,2,3-trichlorobutyral-1):
   (a) $CH_3CHO+Cl_2 \rightarrow CH_2ClCHO+HCl$
   (b) $CH_2ClCHO+CH_3CHO \rightarrow CH_3CHOHCHClCHO$
   (c) $CH_3CHOHCHClCHO \rightarrow$
                                                    $CH_3CH:CClCHO+H_2O$
   (d) $CH_3CH:CClCHO+Cl_2 \rightarrow CH_3CHClCCl_2CHO$ (3) Formation of acetic acid:
   (a) $CH_3CHO+Cl_2 \rightarrow CH_3COCl+HCl$
   In the presence of water:
   (c) $CH_3COCl+H_2O \rightarrow CH_3COOH+HCl$ In the formation of chloral from acetaldehyde the methyl radical is first chlorinated to the mono-chlor stage, then to dichloracetaldehyde and finally to trichloracetaldehyde or chloral, and in order to produce an acceptable product, the amounts of dichloracetaldehyde (which distills at approximately the same temperature as the chloral) must be low with reference to the chloral, preferably of the order of 1 or 2% thereof if complicated separation processes are to be avoided. This, therefore, requires a high degree of chlorination without the formation of large amounts of side reaction products such as result from Reactions 2 and 3.

In Reaction 2 producing butylchloral, one molecule of monochloracetaldehyde condenses with one molecule of the unreacted acetaldehyde thereby effectively removing two molecules of the original acetaldehyde from further reaction to produce chloral and correspondingly reducing the yield of chloral. Water is a by-product of this reaction and water tends to react with chloral to produce chloral hydrate which is difficult to separate from chloral and likewise reduces the recovery thereof. Therefore, Reaction 2, to the extent it takes place, materially reduces the yield of chloral as well as complicates the separation of chloral from the reaction mixture. Reaction 3a may take place by direct substitution of the aldehyde (CHO) hydrogen with chlorine but it appears more likely that this reaction involves the oxidation of acetaldehyde to acetic acid by HOCl which is formed between unreacted chlorine and water present as follows:

$$Cl_2+H_2O \rightarrow HOCl+HCl$$

In any event, it is necessary to operate our process so as to prevent Reactions 2 and 3 from taking place as much as possible and produce a high yield of chloral.

We have discovered that when monochloracetaldehyde and unreacted acetaldehyde are present in a reaction mixture in which no free or unreacted chlorine is present, Reaction 2b with all of its following side reactions tends to take place, whereas in a reaction mixture in which an excess of free chlorine over that consumed in the reaction is present, the unreacted aldehyde tends to react with the free chlorine to produce monochloracetaldehyde according to Reaction 1a. After all of the acetaldehyde has been chlorinated to the monochloracetaldehyde stage, the tendency of Reactions 2 and 3 to take place is materially reduced.

We have found that Reactions 2 and 3, or other side reactions, can be retarded and a high yield of directly distillable chloral produced if non-aqueous acetaldehyde, or its reversible polymers, is chlorinated as rapidly as possible while maintaining an excess of chlorine over that consumed in reaction. As the reaction proceeds the reaction mixture becomes diluted with the reaction products and if desired non-aqueous diluents may be used in the initial chlorination of the acetaldehyde.

The use of diluents reduces to some extent the necessity for rapid chlorination and if used initially, the diluent should be present in amounts of at least 3.5 mols of diluent per mol of acetaldehyde and preferably in amounts of 10 mols or more per effective mol of acetaldehyde. Whether the acetaldehyde or its reversible polymers is chlorinated without a diluent or with an initial diluent, the chlorine should be fed into the reaction mass at a rate which will supply all the chlorine consumed in the reaction and a slight excess thereof if the production of large amounts of butylchloral according to Reaction 2 are to be avoided.

When a diluent is used initially the preferred diluent is the chlorination product of acetaldehyde or its reversible polymers such as chloral or mono- or dichloracetaldehyde or mixtures thereof. When using chlorinated aldehydes as the diluent and introducing the chlorine and aldehyde in a ratio sufficient to convert the aldehyde to chloracetaldehyde and maintain a slight excess of unreacted chlorine in the reaction mixture, the concentration of the aldehyde in the reaction mass may be maintained as low as found necessary or desirable and reaction conditions maintained which favor the formation of the desired chlorination products while the formation of undesired by-products is minimized. Other non-aqueous liquid diluents which are miscible with the aldehyde or its chlorination product may be used, however, such as acetic acid, organic solvents such as carbon tetrachloride, and the like.

Theoretically, at least 3 mols of chlorine per mol equivalent of acetaldehyde are required in the instant process to convert the acetaldehyde or its reversible polymers to chloral. However, due to the fact that part of the acetaldehyde or its reversible polymers is converted into undesirable by-products utilizing less than 3 mols of chlorine and certain amounts of aldehyde are lost in the chlorination, it is difficult to specify a particular amount of chlorine to produce a satisfactory yield of a desired chlorination product.

The efficient operation of the process requires that a slight excess of chlorine be used since it is difficult to regulate the rate of flow of the chlorine gas such that all of it is consumed in the reaction and yet no unreacted aldehyde exists. The excess of chlorine over that consumed in the reaction with the aldehyde should not be large, as a large excess of chlorine in the reaction mass tends to promote reaction of the free chlorine with the chloral to produce carbon tetrachloride and to produce other side reactions as described above. Ordinarily an excess of between about 1 and 7 grams per liter or approximately .07 to .50 weight percent of free chlorine in the reacting mass is sufficient to influence the reaction in the desired direction and prevent the undesired side reactions leading to the production of butyl chloral and acetic acid and insufficient to produce substantial amounts of carbon tetrachloride. Unused chlorine which escapes from the reaction mass will pass out of the reaction vessels with the by-product hydrogen chloride.

The reaction may be initiated at room temperatures and the temperatures permitted to rise as a result of the exothermic heat of chlorination. Where it is desired to lessen the chlorination cycle, however, chlorination may be initiated at temperatures of at least 50° C. or even at 70° C. or more.

In order to obtain high yields of chloral, it is desirable to use reaction promoting substances or other reaction promoting techniques at least in the latter phase of the process. The preferred reaction promoting substances are metal chlorides, such as those of iron, zinc, antimony, tin, and chlorides of phosphorus or mixtures thereof. Antimony trichloride has proved to be especially advantageous. Generally speaking, not more than 10% of the chlorides as compared to the weight of acetaldehyde can be used economically in the process. By using such reaction promoters, yields in excess of 75% of chloral on the acetaldehyde processed can be obtained without operating at temperatures in excess of the boiling point of the diluents used or that of the reaction mass.

Among the other reaction promoting techniques which may be used is chlorination at temperatures above the normal boiling point of the reaction mass.

In general, any reaction promoter or reaction promoting technique used in chlorination or any chlorination catalyst, including light, may be used to increase the yield and if a high yield is not important, chloral can be produced without the use of a reaction promoter or reaction promoting technique or chlorination catalyst. However, as light also tends to promote the reaction of free chlorine and chloral to produce carbon tetrachloride, we prefer to conduct our chlorination in the dark and to store the crude chloral in storage tanks from which light is excluded until final distillation of the chloral from the reaction mixture.

To test the effect of the rapidity of chlorine input, and therefore the amount of free chlorine in the reaction mass, on the production of chloral, butyl chloral, acetic acid, etc., a series of experiments were run on the chlorination of paraldehyde without a diluent in which chlorine was fed into the reaction mass at different rates such that the time to reach a 1 to 1 molar ratio of chlorine reacted with aldehyde was varied from 6 hours to 1 hour to .3 hour. After a 1 to 1 ratio of chlorine reacted with aldehyde had been reached the chlorination was continued for several hours in the presence of antimony trichloride as a catalyst to increase the chloral yield. As the time to reach a 1 to 1 ratio of reacted chlorine to aldehyde was reduced, the amount of chloral formed increased and the amount of butyl chloral decreased.

EXPERIMENTAL BATCHWISE CHLORINATION OF PARALDEHYDE AT 40° TO 50° C.

| | Experiment 1 | Experiment 2 | Experiment 3 |
|---|---|---|---|
| Temperature, Average | 46 | 47 | 45 |
| Time to 1 to 1 Cl$_2$/CHO Ratio, hrs | 6 | 1.0 | 0.30 |
| Total Time, hrs | 33 | 21 | 17 |
| To Reactor, Moles: | | | |
| —CHO | 20 | 3.0 | 2.0 |
| Cl$_2$ | 42.2 | 8.9 | 9.3 |
| Percentage Yield Based on —CHO reacted: | | | |
| Acetic Acid | 4.3 | 5.3 | 5.5 |
| Dichloracetaldehyde | 3.4 | 12.7 | 9.4 |
| Chloral | 12.5 | 35.0 | 45.0 |
| Butyl Chloral | 64.9 | 13.5 | 10.8 |
| CCl$_4$ | 1.3 | 0.1 | 0.4 |
| Unidentified | 18.6 | 18.4 | 14.3 |
| Total | 105.0 | 85.0 | 85.4 |

The present process is advantageously operated by rapidly chlorinating anhydrous acetaldehyde or its reversible polymers without a diluent or by introducing acetaldehyde or its reversible polymers and a reaction promoting agent continuously into a body of previously chlorinated acetaldehyde or other non-aqueous diluent preferably having free chlorine dissolved therein, continuously introducing chlorine into the body of said reaction mass sufficient to keep an excess of free chlorine therein and continuously withdrawing the reaction product therefrom. In such a continuous system a single reactor may be used, but it is preferable to use at least two reactors with part of the chlorine necessary to convert the aldehyde to chloral being introduced into each of the reactors. The reaction promoting agent or reaction promoting technique may be used in either or both of the reactors. More than two reactors may be used but generally are not necessary. When using the plurality of reactors and an efficient reaction promoter, substantially all of the dichloracetaldehyde, which is difficult to separate from the chloral, may be converted to chloral, the amount remaining being reduced to 2% or less. When the amount of dichloracetaldehyde is less than 2% it may be distilled off with the chloral and the distillation product converted to DDT without the necessity for separating out the dichloracetaldehyde.

The process can be operated with a batch or intermittent rather than continuous addition of the aldehyde. The preferred procedure for this mode of operation involves adding the aldehyde to a relatively large volume of chlorination product having free chlorine dissolved therein, chlorinating until the desired chlorination product is reached and some free chlorine left in the product, withdrawing enough material to reduce the content of the reactor to the same volume as that present before the addition of aldehyde, and then repeating the cycle. This intermittent technique is a type of continuous operation. In the batch process the aldehyde and the desired amount of diluent are introduced into the chlorinator, and chlorine is then introduced sufficient to maintain an excess of free chlorine until the desired degree of chlorination is obtained. The reaction promoting material may be introduced into the batch or simultaneously with the chlorine.

Care should be taken to avoid the accumulation of explosive mixtures in the gas space at the top of the reaction chamber when using a batch operation. Such precautions are generally known to persons skilled in the art and are more particularly described in our copending application, Serial No. 745,726, filed May 3, 1947, now Patent No. 2,615,049.

If the instant process is carried out continuously, there is not much danger of explosions except possibly when starting up the chlorination since, after a steady state is reached, hydrogen chloride is evolved continuously and dilutes the chlorine-aldehyde vapors to such an extent that they are not explosive. In a special embodiment involving continuous chlorination at about 85° C. in a body of liquid consisting principally of chloral, there is no danger of explosions even when initiating the process since the vapor pressure of chloral is so high as to preclude the possibility of an explosive mixture of chlorine and aldehyde vapors. Likewise, where the diluent is the chlorination product of acetaldehyde or its reversible polymers, especially chlorination products containing a substantial amount of chloral, explosive mixtures are not formed. The absence of explosive conditions when operating in accordance with preferred procedures described herein constitutes a special feature of this invention.

In the operation of our process, paraldehyde is preferably used, although kindred yields can be obtained from acetaldehyde. Acetaldehyde is more difficult to handle, and the reaction is more difficult to control.

In a typical operation, two connected reactors provided with agitators, vent valves, and so forth, are used. The desired amount of chlorinated acetaldehyde to be used as a diluent is introduced into the first reactor and chlorine added thereto sufficient to provide some excess of free chlorine; usually 1 gram per liter of free chlorine or about .07% by weight is sufficient but in normal operation the free chlorine in the first reactor is usually between .15 and .25 wt. percent and in the second reactor between .25 and .50 wt. percent. Each of the reactors is maintained at a temperature of approximately 85° C. The aldehyde and about 2.3% of the weight thereof of antimony trichloride or other reaction promoter are introduced continuously into the first reactor. Simultaneously, the desired amount of chlorine to react with the aldehyde and maintain an excess of free chlorine in the reaction mixture is introduced into the two reactors, the larger portion being introduced into the first reactor. The excess of chlorine may be maintained by increasing or decreasing the chlorine feed in accordance with the fall of chlorine concentration in the reaction mass as determined by periodic analysis of the reaction mass.

Hydrogen chloride is evolved from each of the reactors. The rate of flow of the chlorinated material from the first reactor to the second reactor is determined by the rate of introduction of the various ingredients. The average retention time of the liquid in each chlorinator is adjusted to approximately one hundred forty hours but this may vary with the size of the reactors, the temperature of the reaction, and so forth. The crude chloral leaving the second chlorinator may be directly purified by vacuum rectification without intermediate chemical treatment. By proceeding in this manner, chloral approximating 75% of the theoretical yield is obtained, while less than 1% of the original aldehyde remains as dichloracetaldehyde.

We have discovered that when high yields of chloral are desired in a continuous process with most advantageous use of the apparatus, it is necessary to introduce part of the chlorine after substantially all of the acetaldehyde material has been converted into chloroacetaldehyde. In our process we complete the chlorination in a second chlorinator, but it is apparent that such a procedure is a special embodiment of a system for introducing part of the chlorine at intermediate points along the path of flow in the system. For example, it is estimated it will take four times as long to obtain the same degree of chlorination in a single reactor or chlorinator as it takes with two reactors in series; or, saying it differently, two chlorinators in series will produce twice as much of a desired chlorinated product as two reactors of the same size in parallel.

The invention will be readily understood from a description of the practical operation of the process as applied to a preferred procedure. In the description reference will be made to the accompanying drawing wherein the apparatus and connections are diagrammatically illustrated.

Paraldehyde is continuously fed into the first chlorinator 10 through conduit 11. Simultaneously chlorine is led from a source of supply (not shown) through line 12 and thence partially through line 13 into the first chlorinator 10 and partially through line 14 into the second chlorinator 15. The chlorinators and the connecting conduits in the system do not have to be highly chemically resistant and may be made of metal such as nickel or Monel metal although the usual chemically resistant materials may be used. Antimony trichloride or other chlorination catalyst is continuously or intermittently introduced into the first chlorinator 10 through conduit 16. Partially chlorinated aldehyde and catalyst are withdrawn from the first chlorinator 10 through conduit 17 and introduced into the second chlorinator 15.

The material in the first chlorinator 10 and in the second chlorinator 15 is agitated and mixed by a circulating system generally designated by 18 and 19 respectively. If necessary, the fluid flowing through the circulating system may be provided with heating or cooling means to control the temperature of the reaction mass.

The gaseous hydrogen chloride formed in the chlorination of the paraldehyde together with certain amounts of the unchlorinated aldehyde and partially chlorinated aldehyde is withdrawn from the first chlorinator 10 through conduit 20 and from the second chlorinator 15 through conduit 21 and is thence conveyed through conduit 22 to a condenser 23. The gaseous hydrogen chloride and unused chlorine pass through the condenser and are withdrawn through conduit 24. These gaseous materials may be collected or passed into the atmosphere. In plant operations a sufficient excess of chlorine may be maintained by maintaining from 2 to 10 volume percent of chlorine in the vent gases from the chlorinators and increasing or decreasing the chlorine feed in accordance with the amount of chlorine in the vent gases as determined by periodic analysis. The condensed aldehyde and partially chlorinated aldehyde flow back into the first chlorinator 10 through conduit 25.

The chlorinated material is withdrawn from the second chlorinator 15 through conduit 26 and introduced into storage tank 27 which is preferably constructed to exclude light and heated to above 50° C. to prevent polymerization of the crude chloral.

This material, when partially chlorinated aldhehydes or other non-aqueous diluents have been used in chlorinators 10 and 15, is a crude chloral containing more than 75% of chloral and less than 2% of dichloracetaldehyde based on the quantity of aldehyde used and substantially free of other materials boiling near the boiling point of chloral and as the mixture is substantially non-aqueous, the chloral can be separated therefrom without further chemical treatment by fractional distillation into two fractions in which the chloral and dichloracetaldehyde constitute the overhead fraction and butyl chloral, catalyst, etc. constitute the bottom fraction. Chloral boils at 97.6° C. and in the substantial absence of water and other materials boiling near this temperature, the separation of a refined product is exceedingly simple. The crude chloral may be shipped at this point to a rectification plant or to a manufacturer of DDT for rectification and conversion into DDT.

The presence of small amounts of water, such as formed in the butyl chloral side reaction, does not interfere with the separation of a refined chloral of high purity by distillation. Care must be taken, however, to avoid the introduction of water from the atmosphere or other sources. Amounts of water up to 1% cause no difficulty and only slight loss of chloral in the separation of chloral from the crude mixture by distillation. In the distillation process some water is removed as chloral hydrate in the still bottoms.

When it is desired to purify the chlorinated material at the point of manufacture, it may be withdrawn from tank 27 through conduit 28 and introduced into a vacuum distillation tower 29. Distillation customarily takes place at temperatures of the order of 100° C. and under a pressure of approximately 100 to 120 millimeters of mercury. At this pressure the boiling point of chloral is about 40.2° C., the boiling point of chloral hydrate is about 55° C. and the boiling point of butyl chloral is about 99° C. and separation into a low boiling and a high boiling fraction is relatively simple.

The lower boiling fractions from the distillation tower 29 pass through conduit 30 to a condensing system 31, where the vapors are liquefied and uncondensed gases vented to the atmosphere. The condensed liquids flow through conduit 32, where part, constituting the chlorinated product, is withdrawn through conduit 33 and the remainder reintroduced into tower 29 through conduit 34. The impurities, such as butyl chloral, any small amounts of chloral hydrate formed by water present, catalyst and other high boiling fractions together with a small amount of chloral, flow from the bottom of the tower 29 through conduit 35 into heater 36 maintained at a temperature of 110° to 120° C., from which the lighter ends containing some chloral are revaporized back into the tower 29 and the higher boiling fraction withdrawn through conduit 37.

In such a system yields of chloral of high purity equaling or exceeding 75 to 80% based on the quantity of aldehyde used can be produced with an average retention time in each chlorinator of three and a third to four days when operating at temperatures of 50° to 90° C.

The following examples further illustrate the operation of the process.

*Example 1*

Anhydrous paraldehyde without a diluent was introduced into a reactor and chlorinated batchwise as rapidly as possible to a 1.2 to 1 ratio of chlorine to aldehyde. Unreacted chlorine and by-product hydrogen chloride were continuously vented from the reactor. Thereafter paraldehyde and chlorine were fed into the reactor at the relative ratio of about 5 mols of paraldehyde to 6 mols of chlorine per hour, using sufficient excess of chlorine to insure maintenance of some excess of chlorine over that consumed in the reaction at all times. The product was withdrawn from the first reactor once per hour in such amounts as to keep the volume fairly constant. The temperature in the first reactor was maintained at approximately 20° or 35° C. The material withdrawn from the first reactor was placed in the second reactor and further chlorinated until the reaction dropped off sharply at which point a catalyst was added and chlorination continued with gradual increase of temperature up to 90° to 95° C. until a yield in excess of 70% chloral based on the acetaldehyde charged was produced.

The conditions of the reaction were as follows:

|  | Batch 1 | Batch 2 | Batch 3 |
| --- | --- | --- | --- |
| First Reactor: | | | |
| Temperature, °C | 20 | 20 | 35 |
| Cl₂ to Aldehyde, Ratio Reacted | 1.3 to 1 | 1.25 to 1 | 1.50 to 1 |
| Holdup Time, Hrs | 18 | 18 | 19 |
| Second Reactor: | | | |
| Temperature, °C | 30–95 | 30–90 | 30–90 |
| Catalyst | SbCl₃ | SbCl₃ | SbCl₃ |
| Amt. of Catalyst, wt. percent | 2.3 | 2.3 | 2.3 |
| Time to Finish, Hrs | 49 | 36 | 27.5 |
| Yield, Mole Percent: | | | |
| Chloral | 74.6 | 72.0 | 70.0 |
| Dichloracetaldehyde | 3.4 | 3.8 | 3.7 |
| Acetic Acid | | 2.2 | 1.3 |
| Butyl Chloral | 0.0 | 1.5 | 1.4 |
| Total | 78.0 | 79.5 | 76.4 |

By further chlorination of batches 1 and 2, the amount of chloral can be increased and the amount of dichloracetaldehyde reduced to produce yields of more than 75% chloral and less than 2% of dichloracetaldehyde based upon the acetaldehyde processed.

*Example 2*

Into an operating chlorinating system for the production of chloral, such as that illustrated in the diagrammatic representation, chlorine and paraldehyde are continuously fed in a mol ratio of about 9 to 1 into a body of previously chlorinated acetaldehyde containing free chlorine. The chlorine is divided such that from about 5 to 10% is introduced into the second chlorinator. The mixtures in the chlorinators are maintained at a temperature of about 82° C. Antimony trichloride at the rate of about 2.5 parts per 100 parts of paraldehyde is added to the first chlorinator. The amount of previously chlorinated acetaldehyde or other non-aqueous diluent in the first chlorinator is maintained at least 3.5 mols per mol of acetaldehyde fed into the chlorinator and preferably of the order of 10 mols of diluent per mol of acetaldehyde processed. The partially chlorinated mixture from the first chlorinator and intermixed antimony trichloride are withdrawn into the second chlorinator so as to maintain the volume in the first chlorinator substantially constant. The feed rates are such that the average time of retention of the material in the chlorinators is of the order of three to four days. The dichloracetaldehyde can be reduced to a very low percentage, say of the order of 1 to 2% of the chloral, dependent upon the average time of retention in the chlorinators.

By operating in accordance with this system, the amount of butyl chloral and other high boiling fractions can also be reduced to a very low percentage, say of the order of several percent. The yield of chloral from the system is of the order of 70 to 80% or more based upon the amount of aldehyde used. The conversion of the aldehyde to the chlorinated aldehyde is substantially complete. The yield of chloral is less than that theoretically possible primarily due to the fact that a certain amount of the aldehyde and chlorinated aldehydes escapes with the gaseous by-products. Additionally, it is difficult to completely separate the chloral from the high boiling by-products and some chloral is lost in these products. Thus it can be said that the yield is substantially quantitative when considered apart from the inefficiencies inherent in the apparatus.

*Example 3*

Chlorine and paraldehyde are fed in a mol ratio of about 9 to 1 into a chlorination vessel initially filled with chloroacetaldehyde consisting primarily of chloral and maintained at a temperature of 85° C. Antimony trichloride at the rate of 2.3 grams per 100 grams of paraldehyde is also added. The product is withdrawn continuously to maintain a constant volume in the reactor. The feed rates are such that the average time of retention of the material in the chlorinator is 273 hours. The chloral and dichloracetaldehyde in the product, under certain circumstances, represent 59% and 4% respectively of the original aldehyde. When such yields are obtained, only 2% of the paraldehyde is converted to butyl chloral and approximately 3% to acetic acid.

By more careful controls and regulation of the period of retention, the procedures of this example may be used to produce typical yields of 75% of chloral and 1% of dichloracetaldehyde based on the aldehyde used.

*Example 4*

Upon repeating the chlorination described in Example 3 with a retention time of sixty-eight hours, the chloral and dichloracetaldehyde in the reaction product typically represents 70% and 6% respectively of the original paraldehyde, although yields as low as 59% and 15% respectively are at times obtained.

Example 5

The operations described in Example 3 were repeated with a second chlorinator in series with the first. The chlorine feed was divided between the two, the greater part going to the first chlorinator. Customarily from 5 to 10% of chlorine is introduced into the second reactor. The retention time in each chlorinator was sixty-eight hours. The chloral and dichloracetaldehyde in the product represent 78% and 0.6% respectively of the original paraldehyde.

Example 6

Chlorine and paraldehyde are fed continuously into a reactor charged with commercial chloral to which free chlorine in the amount of at least 1 gram per liter has been added and maintained at 70° C. The mol ratio of chlorine to paraldehyde is 4.5 to 1, or one-half the amount theoretically necessary to convert the aldehyde to chloral. The feed rate is such that the average retention time in the chlorinator is twelve hours. The initial reaction product consists principally of mono-and dichloracetaldehyde. As the chlorinated aldehyde is formed, it serves as a diluent for the paraldehyde being introduced. Antimony trichloride is added to this product at the rate of 7 grams per 100 grams of original aldehyde. The chlorination is then completed batchwise at an average temperature of about 80° C. In the final product 72.5% of the original aldehyde is present as chloral and 2.3% as dichloracetaldehyde.

The amount of dichloracetaldehyde can be reduced to 1% or less of the original aldehyde by using a longer period of reaction.

The chloral may be separated from the crude reaction product by vacuum rectification at, say, about 100 millimeters of mercury absolute pressure. Care should preferably be taken to exclude light from the crude chloral mixture during storage and distillation so as to reduce the reaction between the chloral and free chlorine therein and prevent the formation of carbon tetrachloride in the product. In such separatory procedures the chloral, containing certain low boiling by-products such as dichloracetaldehyde, constitutes the overhead product while the antimony trichloride, butyl chloral and high boiling impurities remain in the still or reboiler and are removed therefrom. A second rectification may be used to remove the low boiling impurities, but in most uses of the product this is unnecessary.

The crude chloral is maintained at a temperature above 50° C. by heating the storage tank 27 to prevent polymerization and freezing in the storage tanks. Polymerized crude chloral may, however, be depolymerized by prolonged heating at temperatures above 80° C.

In the illustrative embodiments of the examples where the aldehyde is converted into chloroacetaldehyde in one reactor and the chlorinated acetaldehyde more highly chlorinated in a succeeding reactor, the first stage of the chlorination could be eliminated by procuring chloroacetaldehydes from other sources, such as monochloracetaldehyde produced from vinyl chloride and hypochlorous acid. When the second stage above is used, diluents are unnecessary since the chloroacetaldehydes apparently undergo undesired side reactions, such as oxidation to acetic acid or condensation reactions, much less rapidly than the unchlorinated aldehyde.

The crude product obtained by the processes described above thus may contain, depending on the degree and time of chlorination, from 70 to 80 or more moles of chloral and of the order of 1 to 2 moles or less of dichloracetaldehyde for each 100 moles of aldehyde processed, and the process can be operated so as to result in less than 2 mole percent of the aldehyde being converted into butyl chloral and approximately 3 mole percent into acetic acid.

With such a product the chloral may be recovered without further chemical treatment by distillation as described and a refined product suitable for conversion to DDT and for other purposes produced. A typical analysis of the crude chloral and refined chloral produced therefrom by distillation is as follows:

|  | Crude Chlorination Product, percent | Finished Chloral, percent |
| --- | --- | --- |
| Chloral | 87.0 | 96.5 |
| Dichloracetaldehyde | 1.0 | 0.8 |
| $CCl_4$ | 3.0 | 2.0 |
| HCl | 1.4 | 0.2 |
| $Cl_2$ | 0.3 | 0.0 |
| $H_2O$ | 0.7 | 0.3 |
| HAc | 1.0 | 0.2 |
| $SbCl_3$ | 0.8 | 0.0 |
| Other | 4.8 | 0.0 |

In the above table all percentages are by weight rather than by percentage yield on the acetaldehyde processed, as given in the examples.

It will be understood that acetaldehyde and its reversible polymers encompass monomeric acetaldehyde having the formula $CH_3CHO$ and those polymers having the formula $(CH_3CHO)_n$ which may be made reversibly from it, such as paraldehyde, metaldehyde, and the like. When metaldehyde is used in the process, it is preferably used in a liquid medium.

This application is a continuation in part of our applications Serial No. 745,726, filed May 3, 1947, now Patent No. 2,615,049, and Serial No. 55,452, filed October 20, 1948, now Patent No. 2,615,048.

The reaction theories expressed herein are for the purpose of illustrating and explaining our invention but we do not wish to be bound by the theories herein set forth.

The description constituting illustrative embodiments of the invention is not to be considered a limitation upon the invention, for the invention contemplates various adaptations, alterations, and modifications within the scope of the invention which is defined by the appended claims.

We claim:

1. The method of producing substantially anhydrous chloral from acetaldehyde and its reversible polymers which comprises introducing anhydrous acetaldehyde and its reversible polymers into a closed reaction vessel, introducing chlorine into said aldehyde at a rate in excess of the rate of consumption of chlorine in reaction with said aldehyde, periodically determining the free chlorine in the reaction mixture and regulating the relative amount of chlorine introduced into the reaction mixture to maintain a free chlorine concentration in the reaction mixture between .07 and .50 weight percent, completing the chlorination in the presence of a catalyst, passing gaseous hydrogen chloride and unused chlorine from said reaction vessel, condensing acetaldehyde and partially chlorinated acetaldehyde from said gases and returning the condensate to the reaction vessel, and continuing said chlorination until a major portion of the acetaldehyde has been converted to chloral.

2. The method of producing substantially anhydrous chloral from acetaldehyde and its reversible polymers which comprises introducing anhydrous acetaldehyde and its reversible polymers into a closed reaction vessel, introducing chlorine at a rate in excess of the rate of consumption of chlorine in reaction with said aldehyde, maintaining the excess of chlorine in the reacting mass between about 1 and about 7 grams per liter, completing the chlorination in the presence of a catalyst and passing gaseous hydrogen chloride and unused chlorine from said reaction vessel, condensing acetaldehyde and partially chlorinated acetaldehyde from said gases and returning the condensate to the reaction vessel, and continuing said chlorination until more than 70% of the acetaldehyde has been converted to chloral and less than 2% of dichloracetaldehyde remains in said reaction mass.

3. The method of producing substantially anhydrous chloral from acetaldehyde and its reversible polymers which comprises introducing anhydrous acetaldehyde and its reversible polymers into a closed reaction vessel, introducing chlorine into said aldehyde at a rate in excess of the rate of consumption of chlorine in reaction with said aldehyde, periodically determining the free chlorine in the reaction mass and regulating the relative amount of chlorine introduced into the reaction mass to maintain a free chlorine concentration of between about 1 and about 7 grams per liter, introducing a catalyst into said reaction mass and passing gaseous hydrogen chloride and unused chlorine from said reaction vessel, condensing acetaldehyde and partially chlorinated acetaldehyde from said gases and returning the condensate to the reaction vessel, and continuing said chlorination until a major portion of the acetaldehyde has been converted to chloral.

4. The method of producing substantially anhydrous chloral from acetaldehyde and its reversible polymers which comprises introducing anhydrous acetaldehyde and its reversible polymers into a closed reaction vessel, introducing chlorine into said aldehyde at a rate in excess of the rate of consumption of chlorine in reaction with said aldehyde, periodically determining the free chlorine in the reaction mass and regulating the relative amount of chlorine introduced into the reaction mass to maintain a free chlorine concentration in the reaction mass of between about 1 and about 7 grams per liter, introducing a catalyst into said reaction mass and passing gaseous hydrogen chloride and unused chlorine from said reaction vessel, condensing acetaldehyde and partially chlorinated acetaldehyde from said gases, introducing the reaction product from said first reaction vessel into a second closed reaction vessel, introducing chlorine into said reaction product in said second vessel at a rate in excess of the rate of consumption of chlorine in said second reaction vessel, passing gaseous hydrogen chloride and unused chlorine from said second reaction vessel, condensing acetaldehyde and partially chlorinated acetaldehyde from said gases, and continuing said chlorination until a major portion of the acetaldehyde has been converted to chloral.

5. A continuous process of producing substantially anhydrous chloral which comprises establishing and maintaining bodies of non-aqueous liquids non-reactive with acetaldehyde and its chlorination products in a series of closed reaction vessels, introducing anhydrous acetaldehyde and its reversible polymers into the first of said reaction vessels in the ratio of not more than 1 mol of acetaldehyde to 3.5 mols of said non-aqueous liquid, introducing chlorine into said reaction mixture in said first vessel at a rate in excess of the rate of consumption of chlorine in reaction with said mixture until chlorine has been reacted in at least a 1 to 1 mol ratio of the aldehyde present, periodically determining the free chlorine in the reaction mixture and regulating the relative amount of chlorine introduced into the reaction mixture to maintain a free chlorine concentration in the reaction mixture of between .15 and .25 weight percent, passing gaseous hydrogen chloride and unused chlorine from said first reaction vessel and condensing acetaldehyde and partially chlorinated acetaldehyde from said gases, continuousuly withdrawing said partially chlorinated acetaldehyde from the first vessel and introducing said partially chlorinated acetaldehyde into a second vessel, introducing chlorine into the partially chlorinated acetaldehyde in said second vessel at a rate in excess of the rate of consumption of chlorine in reaction therein, periodically determining the free chlorine in the reaction mixture and regulating the relative amount of chlorine introduced into the reaction mixture in said second vessel to maintain a free chlorine concentration in the reaction mixture of between .25 and .50 weight percent, introducing a catalyst into said second vessel, passing gaseous hydrogen chloride and unused chlorine from said second vessel and condensing acetaldehyde and partially chlorinated acetaldehyde from said gases, and continuing the chlorination of said partially chlorinated acetaldehyde until more than 70% of the acetaldehyde has been converted into chloral and less than 2% of dichloracetaldehyde remains in said product.

6. In the method of manufacturing polychlorinated acetaldehyde from acetaldehyde and its reversible polymers by the step of chlorinating acetaldehyde and its reversible polymers in an anhydrous chlorination step, for producing polychlorinated acetaldehyde comprising combining chlorine and said acetaldehyde in amounts ranging from 2 to 3 mols of chlorine per mol equivalent of acetaldehyde in an anhydrous menstruum, maintaining the temperature of the reaction within the range of 20° to 85° C. during the anhydrous chlorination step, periodically determining the free chlorine in the reaction mixture and regulating the relative amount of chlorine introduced into the reaction mixture to maintain a free chlorine concentration in the reaction mixture between .07 and .50 weight percent, and recovering polychlorinated acetaldehyde from the chlorination reaction mixture.

References Cited in the file of this patent

UNITED STATES PATENTS

| | | |
|---|---|---|
| 2,615,048 | Pianfetti et al. | Oct. 21, 1952 |
| 2,615,049 | Pianfetti et al. | Oct. 21, 1952 |
| 2,697,120 | Gilbert | Dec. 14, 1954 |